Feb. 27, 1923.

F. ZARDINONI

DUMPING TRUCK

Original Filed May 23, 1921

1,447,003

Inventor
Faust Zardinoni.
By Geo. P. Kimmel. Attorney

Patented Feb. 27, 1923.

1,447,003

UNITED STATES PATENT OFFICE.

FAUST ZARDINONI, OF CHICAGO, ILLINOIS, ASSIGNOR OF ONE-HALF TO VINCENZO L. MONACO, OF CHICAGO, ILLINOIS.

DUMPING TRUCK.

Original application filed May 23, 1921, Serial No. 471,709. Divided and this application filed March 28, 1922. Serial No. 547,564.

*To all whom it may concern:*

Be it known that I, FAUST ZARDINONI, a citizen of the United States, residing at Chicago, in the county of Cook and State of Illinois, have invented certain new and useful Improvements in Dumping Trucks, of which the following is a specification.

The invention appertains to certain improvements in dumping vehicles, and more particularly to the motor truck class of such vehicles.

The principal object of the invention is to provide for a mechanically refined construction and arrangement of dumping mechanisms for the bodies of vehicles of the type specified, and of a nature particularly adaptable for application to vehicles of light weight construction, whereby to facilitate the operation of the dumping bodies therefore with the ease and rapidity comparable to the present known and larger trucks and vehicle dumping mechanisms whether actuated manually or by a power means.

Another object of the invention is the provision of a truck of this character wherein the load carrying body is supported for tilting movements, the chassis of said body being constructed in a novel manner, so that, when the body is brought to rear end tilting position, it can rest upon inclined portions of the chassis at the rear end thereof, and thus relieve, to a certain extent, the weight of the load from the axis of the tilting movement of said body.

Another object of the invention is the provision of a truck of the character mentioned, and one wherein the dumping body thereof, when in tilting position, enables through gravity action, the dislodging and complete discharge of a load from the body, the body being supported in a novel manner and the raising and lowering thereof being effected through the medium of a novel means, which is manually controlled by the operator of the truck.

A still further object of the invention is the provision of a truck of the type mentioned, and one which is comparatively simple in construction, thoroughly reliable and efficient in its purpose and operation, and inexpensive to manufacture.

With the foregoing and other objects in view, the invention, constituting divisional subject matter of my copending application filed May 23, 1921, and serially numbered 471709, resides in the certain novel and useful construction and arrangement of parts as will be hereinafter more fully described, set forth in the appended claims, and illustrated in the accompanying drawing, in which:—

Figure 1:
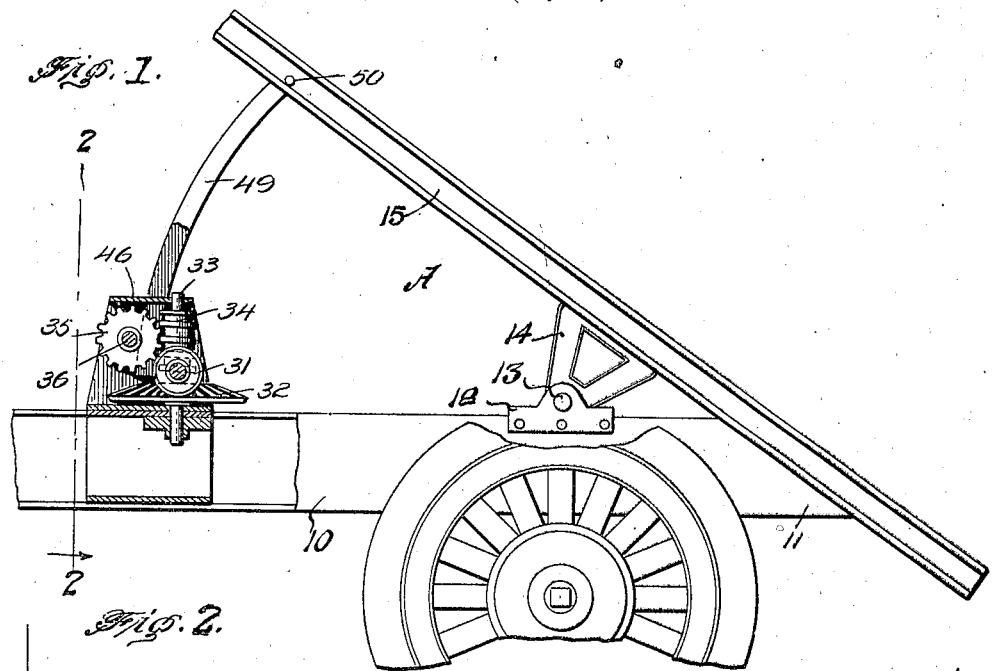
Figure 2:
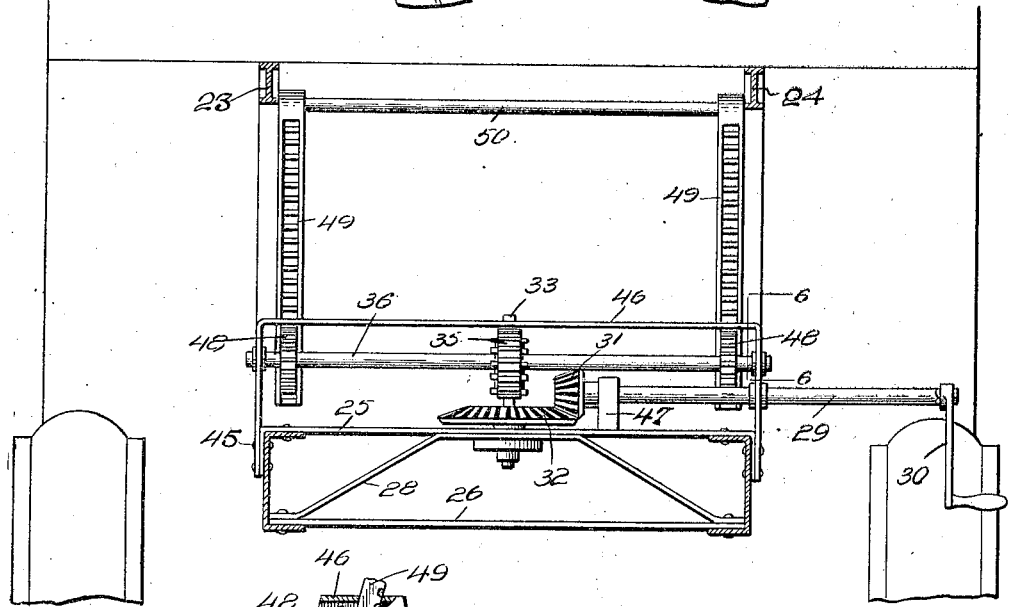
Figure 3:

Figure 1 is a fragmentary side elevation, partly in section, of a preferred embodiment of the invention, Fig. 2 is a fragmentary vertical section taken on the line 2—2 of Fig. 1, and, Fig. 3 is a fragmentary sectional detail of a portion of the dumping mechanism.

Referring to the drawing, A designates generally a dumping vehicle, preferably of the motor truck type, having its chassis 10 constructed and arranged to provide a rearwardly inclined end portion 11, and mounted on the opposite side bars of the chassis 10, in transverse alinement thereon, and inward of the rear inclined end portion 11 thereof, are a pair of bearings 12 in which is journalled the opposite ends of a dumping shaft 13, carried in bearing brackets 14 depending from and at opposite sides of the dumping body frame 15. The pivotal point of the body frame 15 or the journalling of the shaft 13 at or near the point as shown, provides for a major length of the dumping body frame to overlie the vehicle chassis 10 in a direction toward the forward end thereof, and for the rearwardly directed minor end portion of the body to extend outwardly from the rearwardly inclined end portion 11 of the same.

The hoisting and lowering mechanism comprises a transverse bracket extending between and secured at the opposite side bars of the chassis 10, and this bracket consists of a pair of upper and lower bars or plates 25 and 26, and an angularly bent brace bar 28 interposed between the bars or plates and connecting the lower bar or plate 26 at its opposite ends and having its medial portions engaging an intermediate portion of the under face of the upper bar 25. Rising from the opposite outer side of the chassis 10 and secured thereto as at 45, are the oppositely angularly bent portions of a bar or plate 46, which is arranged to have its medial portion extending transversely of the chassis above and parallel to the bracket bars or plates 25 and 26. Journalled through one of the vertical portions of the bar or plate 46, and extending inwardly from one side of the vehicle chassis is a manually actuated shaft 29 having a hand crank 30 at its outer end, the inner end of this shaft 29 being journalled in a bearing 47 and has keyed on the same, inwardly of the bearing 47, a bevelled pinion 31 arranged in mesh with a bevelled gear 32, which is, in turn, keyed on a vertically disposed shaft 33 journalled at its opposite ends in the bracket bars or plates 25 and 46. Carried on the shaft 33, above the bevelled gear 31, is a worm gear 34, arranged in mesh with the worm wheel 35 keyed on a shaft 36 extending transversely of the chassis 10, and journalled at its opposite ends in the vertical portions of the bar or plate 46. Keyed on the opposite ends of the shaft 36 are a pair of pinions 48 arranged in mesh with a complemental pair of curved rack bars 49, which are dependingly supported at their upper ends from a shaft 50, which, in turn, is journalled between the reinforcing and longitudinally extending bars or beams 23 and 24 secured on the under side of the body and forming the supporting frame thereof.

In the operation of this form of the invention, assuming that the body frame 15 is in its normally horizontal position on the chassis 10 and loaded, turning movement of the hand crank 30, will rotate the shaft 29, the bevelled gear 31, the bevelled gear 32, the worm gear 34, the worm wheel 35, the shaft 36, and the pinions 48 carried by the latter, when the rack bars 48 will travel in an upward direction raising the body 15 to dumping position.

In full dumping position, as shown in Fig. 1, the rear end portion of the body frame 15 will be supported on the inclined end portion of the chassis 10, whereby to take a major portion of the load strain thereof off of the pivotal point of the body on the chassis. From this position, the lowering operation of the body frame 15 is accomplished by the manipulation of the hand crank 30, on the gearing of the hoisting and lowering mechanism in a reverse direction of rotation, and this movement is facilitated by the weight of the major forward end portion of the body inward from its pivotal point on the chassis 10.

By reason of the disposition of the axis or pivotal movement of the body, the force of gravity is exerted on the opposite ends of the body during its tilting movements in a manner to greatly facilitate the manual actuation of the dumping mechanism, whereby to minimize the pivotal exertion on the part of the operator during either direction of tilting movement of the body, and it is obvious that the axis or pivotal point of the body may be located at any point on the chassis, other than as shown, so that the center of gravity may be varied to either side of such axis or pivotal point as may be desired.

It is of course understood that, while a preferred embodiment of the dumping truck has been described and illustrated herein in specific terms and details of construction and arrangement of parts, various changes in and modifications of the same may be resorted to without departing from the spirit of the invention, or of the scope of the claims appended hereto.

Having thus fully described the invention, what is claimed, is:—

1. A truck for the purpose set forth comprising a chassis, a tilting body supported thereon, a bearing bracket secured to and extending transversely of the chassis, a transversely extending inverted yoke-shaped support secured to the chassis and positioned over said bracket and provided with openings, curved rack bars pivotally connected to said body and extending through said openings, a shaft journalled in said support and provided with a pair of pinions engaging with said rack bars for shifting them, a worm wheel secured to the shaft and means supported by said bracket and meshing with said worm wheel for driving it, causing thereby the operation of said shaft.

2. A truck for the purpose set forth comprising a chassis, a tilting body supported thereon, a bearing bracket secured through and extending transversely of the chassis, a transversely extending inverted yoke-shaped support secured to the chassis and positioned over said bracket and provided with openings, curved rack bars pivotally connected to said body and extending through said openings, a shaft journalled in said support and provided with a pair of pinions engaging with said rack bars for shifting them, a worm wheel secured to the shaft, a vertically disposed worm element engaging with said wheel for operating it to drive said shaft, means supported by said bracket for driving said worm element and means operated from the exterior of the bracket for driving said means.

In testimony whereof, I affix my signature hereto.

FAUST ZARDINONI.